United States Patent
Austin et al.

(10) Patent No.: US 7,702,285 B2
(45) Date of Patent: *Apr. 20, 2010

(54) SYSTEM AND METHOD FOR DETERMINING MOBILE COMMUNICATION SYSTEM CARRIER FREQUENCY PROPAGATION CHARACTERISTICS

(75) Inventors: Mark D. Austin, Atlanta, GA (US); Ali Jabbary, Atlanta, GA (US); Derek Johnson, Atlanta, GA (US)

(73) Assignee: AT&T Intellectual Property, I,L.P., Reno, NV (US)

(*) Notice: Subject to any disclaimer, the term of this patent is extended or adjusted under 35 U.S.C. 154(b) by 194 days.

This patent is subject to a terminal disclaimer.

(21) Appl. No.: 11/504,891

(22) Filed: Aug. 16, 2006

(65) Prior Publication Data

US 2006/0276140 A1 Dec. 7, 2006

Related U.S. Application Data

(63) Continuation of application No. 09/821,031, filed on Mar. 30, 2001, now Pat. No. 7,095,983.

(51) Int. Cl.
*H04B 17/00* (2006.01)
*H04M 1/00* (2006.01)

(52) U.S. Cl. .................. 455/67.11; 455/423
(58) Field of Classification Search ........ 455/67.11, 455/67.16, 226.2, 423, 424
See application file for complete search history.

(56) References Cited

U.S. PATENT DOCUMENTS

| | | | |
|---|---|---|---|
| 5,481,588 A | 1/1996 | Rickli et al. | |
| 5,515,062 A * | 5/1996 | Maine et al. | 342/457 |
| 5,857,155 A | 1/1999 | Hill et al. | |
| 5,926,762 A | 7/1999 | Arpee et al. | |
| 6,052,597 A * | 4/2000 | Ekstrom | 455/456.3 |
| 6,201,803 B1 | 3/2001 | Munday et al. | |
| 6,711,404 B1 | 3/2004 | Arpee et al. | |
| 7,095,983 B1 * | 8/2006 | Austin et al. | 455/67.11 |

* cited by examiner

*Primary Examiner*—Lee Nguyen
(74) *Attorney, Agent, or Firm*—Cantor Colburn LLP

(57) ABSTRACT

The present invention relates to systems for determining mobile communications system carrier propagation characteristics. In an embodiment, a system includes a frequency scanner, signal strength measurement device, digital verification color code logic, a location determining unit, and a memory. The frequency scanner can output a carrier signal corresponding to a carrier signal identifier, where the frequency scanner is located at a geographical location. The signal strength measurement device can be coupled to the frequency scanner and determine a carrier strength indicator of the carrier signal. The digital verification color code logic can be coupled to the frequency scanner and determine the digital verification color code of the carrier signal. The location determining unit can be coupled to the frequency scanner and determine a location identifier corresponding to the geographical location of the frequency scanner. The memory can be coupled to the frequency scanner and store the carrier signal identifier, the carrier strength indicator, the digital verification color code of the carrier signal, and the location identifier.

20 Claims, 10 Drawing Sheets

| 900 | TIME (950) | LOCATION (910) | CARRIER (920) | CARRIER RSSI (-dBm) (930) | CARRIER DVCC (940) |
|---|---|---|---|---|---|
| 901 | T1 | [801] | F1 | -101 | 11 |
| 902 | T1 | [801] | F1 | -100 | 21 |
| 903 | T1 | [801] | F1 | -87 | 31 |
| 904 | T1 | [801] | F2 | -109 | 21 |
| 905 | T1 | [801] | F2 | -108 | 22 |
| 906 | T1 | [801] | F2 | -84 | 23 |
| 907 | T1 | [801] | F3 | -109 | 31 |
| 908 | T1 | [801] | F3 | -109 | 32 |
| 909 | T1 | [801] | F3 | -70 | 33 |

| | GPS DATA | CARRIER | CARRIER RSSI (dBm) | DVCC |
|---|---|---|---|---|
| 701 | L1 | F1 | -108 | 1 |
| 702 | L1 | F1 | -84 | 8 |
| 703 | L1 | F1 | -106 | 1 |
| 704 | L1 | F1 | -80 | 8 |

US 7,702,285 B2

SYSTEM AND METHOD FOR DETERMINING MOBILE COMMUNICATION SYSTEM CARRIER FREQUENCY PROPAGATION CHARACTERISTICS

CROSS-REFERENCE TO RELATED APPLICATIONS

This application is a continuation of U.S. patent application Ser. No. 09/821,031 filed Mar. 30, 2001, now U.S. Pat. No. 7,095,983 the contents of which are incorporated by reference herein in their entirety.

FIELD OF THE INVENTION

The present invention relates to mobile communications systems. More particularly, the present invention relates to systems and methods for determining mobile communication system carrier frequency propagation characteristics.

BACKGROUND OF THE INVENTION

Known commercial mobile communication systems typically include a plurality of fixed base stations arranged in patterns whereby each base station transmits and receives over a plurality of frequencies. A mobile station within range of the base station can communicate with the external world (e.g., via the Public Switched Telephone Network ("PSTN")) through the base station using the frequencies. The area surrounding a base station in which mobile stations communicate with that base station is often referred to as a cell, with the base station generally positioned toward the center of the cell. Examples of known commercial mobile communications systems having cells include cellular communications systems, Personal Communications Systems ("PCS"), Global System for Mobile communication ("GSM") systems, IS-136/Digital-American Mobile Phone systems (hereinafter "IS-136" or "D-AMPS"), and so on.

In an IS-136 system, a mobile station can communicate with the base station via a carrier frequency pair that includes two different (but paired) frequencies. The first frequency of the pair is the downlink (or forward) frequency where information is transmitted from the base station to the mobile station, and the second frequency of the pair is the uplink (or reverse) frequency where information is transmitted from the mobile station to the base station. Each carrier frequency pair is often referred to as a carrier or a channel, although the term channel is also used in different ways when a carrier can carry multiple channels (e.g., time-division multiple access ("TDMA") channels, code-division multiple access ("CDMA") channels, and so on). An IS-136 system can have 416 carriers, of which 395 carriers are available to carry voice traffic between a mobile station and a base station.

The carriers used by a base station are separated from one another in frequency to minimize interference. A cell's carriers are carefully selected so that adjoining cells do not transmit or receive on the same carrier frequencies. A mobile system operator can allocate to a base station a set of carriers with frequencies that are each separated from the next carrier by an integral number. For example, FIG. 1 shows a known frequency reuse pattern for base station cells, where each cell is assigned a set of carriers. Each cell can be allocated one of seven sets of carriers, where a cluster of seven cells as a whole is allocated all of the carriers. Thus, the frequency reuse pattern illustrated in FIG. 1 is typically referred to as having n=7 clusters. The cells are arranged and frequency sets can be allocated by assigning a first carrier set (e.g., carrier set 1) to a central cell 111 of a first cluster, and then assigning different carrier sets (e.g., carrier sets 2-7) to the cells of the first cluster surrounding that central cell. Thus, cell 111 can have carrier set 1, cell 112 can have carrier set 2, cell 113 can have carrier set 3, cell 114 can have carrier set 4, cell 115 can have carrier set 5, cell 116 can have carrier set 6, and cell 117 can have carrier set 7. Each of the carrier sets are also respectively allocated to the cells 141-147 of a fourth cluster adjacent to cells 111-117 of the first cluster. Portions of other adjacent clusters—such as cells 125 and 126 of a second cluster, cells 131 and 134-137 of a third cluster, and so—are also illustrated.

The assignment of carriers to carrier sets, and the assignment of carrier sets to cells, can be based on the number of different carrier sets (e.g., seven, four, and three carrier sets) and the number of available carriers. An IS-136 system having 395 voice carriers and using a frequency reuse pattern illustrated in FIG. 1 can have approximately 57 carriers per carrier set and cell. With seven different carrier sets, carrier set 1 can include carriers 1, 8, 15, 22, 29, 36 and so on; carrier set 2 can include carriers 2, 9, 16, 23, 30, 37 and so on; carrier set 3 can include carriers 3, 10, 17, 24, 31, 38 and so on; and so forth with respect to carrier sets 4-7.

FIGS. 2 and 3 illustrate other known frequency reuse patterns. In particular, FIG. 2 illustrates a frequency reuse plan having n=3 clusters. A first cluster can have three cells 211-213. Six clusters—such as a second cluster having cells 221-223, a third cluster having cells 231-233, a fourth cluster having cells 241-243, and so on—can be located adjacent the first cluster. Each cell of each cluster can be allocated a third of the available system carriers. FIG. 3 illustrates a frequency reuse plan having n=4 clusters. A first cluster can have four cells 411-114. Six clusters—such as a second cluster having cells 321-324, a third cluster having cells 331-334, a fourth cluster having cells 341-344, and so on—can be located adjacent the first cluster. Each cell of each cluster can be allocated a fourth of the available system carriers.

To allow a mobile station to transmit and receive communications as the mobile station moves from one cell to another, each cell is normally positioned with its area of coverage overlapping the areas of coverage of a number of adjacent and surrounding cells. As a mobile station moves from an area covered by a first base station to an area covered by another base station, mobile station communications (e.g., a voice call, a data link, etc) are transferred from the first base station to the other base station in an area where the coverage from the two cells overlaps. The transfer of a mobile station from communicating with one base station to communicating with a second base station is typically called hand off.

A cell can have at least two types of radio coverage. A first type of cell radio coverage is omnidirectional (i.e., azimuthally), where the cell has an antenna set that can communicate with mobile stations via each carrier of the carrier set allocated to the cell. A second type of cell radio coverage is sectored. FIG. 4 shows an illustration of a sectored cell. Cell 411 includes a plurality of sectors, including sectors 401, 402, and 403. Sectors are often referred to as an alpha sector, a beta sector, and a gamma sector. Cells are typically divided into three sectors, with each sector antenna set that covers a 120° sector. In a cell having three sectors, each sector antenna set can communicate with mobile stations via one-third of the carriers of the carrier set allocated to the cell so that each sector communicates over different carriers as compared to the other sectors of the cell.

Notwithstanding the use of frequency reuse patterns, interference between like carriers of different cells can occur. For example, referring again to FIG. 1, even though cell 131 is a knight's move away from cell 111 (i.e., cell 131 is up two cells and over one cell from cell 111), there can be interference between the carriers of cell 111 and cell 131. For example, within portions of cells 113, 137, and 136, there can be interference between a carrier 1 of cell 111 and a carrier 1 of cell 131. Such interference is typically called co-channel interference.

Co-channel interference can be caused by antenna patterns, power levels, carrier scattering, and wave diffraction that differ from cell to cell. Buildings, structures, mountains, foliage, and other physical objects can cause carrier signal strength to vary over the area covered by a cell. As a result, the boundaries (i.e., edges) at which the signal strength of a carrier falls below a level sufficient to support communications with a mobile station can vary widely from cell to cell. Thus, cells adjacent one another do not typically form anything like the precise geometric patterns illustrated in FIGS. 1-3. Cell coverages, however, must overlap to allow mobile stations to be handed-off between cells, and such overlapping, among other factors, can lead to co-channel interference.

In an IS-136 system, mobile stations are instructed to measure the signal strengths of various carriers and report the measured signal strengths to the mobile system. For example, referring again to FIG. 1, as a mobile station in communication with the base station of cell 111 moves through cell 111 toward cells 112 and 113, the mobile station can be instructed to measure the signal strengths of certain carriers of 111, 112, and 113 and report the measured carrier signal strengths to the mobile system via the base station of cell 111. When the signal strength reported by the mobile station with respect to the cell 111 carrier drops below a certain threshold (e.g., as the mobile station approaches the intersection of cells 111, 112, and 113), the mobile system will pick one carrier of the carriers measured and reported by the mobile station and instruct the mobile station to use that carrier for communications (e.g., instruct the mobile station to begin communicating with the base station of cell 113 or cell 112 via the appropriate carrier). In known IS-136 systems, mobile stations can monitor and report the carrier strengths of neighboring surrounding cells.

Mobile system operators generate frequency reuse plans to, among other things, reasonably minimize co-channel interference and reasonably maximize the likelihood that mobile stations will be successfully handed-off to a next cell as it moves away from its current cell. A first method of generating a mobile system frequency reuse plan is to use a frequency reuse pattern as illustrated in FIGS. 1-3. The efficiency of a frequency reuse plan can be increased by modifying the frequency reuse plan based on knowledge (subjective and/or objective) of the terrain covered by the frequency reuse plan. For example, FIG. 5 illustrates a reuse pattern that has been modified based on terrain characteristics. A first cluster includes cell 511-517. A mountain range 501 abuts the edge of the first cluster at the exterior edges of cells 513 and 514. The mountain range 501 attenuates the carrier signals transmitted by cells 512, 511, and 515. Thus, cells 522, 521, and 525 can use the same carrier sets used by cells 512, 511, and 515 with a reasonable minimization of co-channel interference. By reusing the carrier sets in a more compact manner, the frequency reuse plan illustrated in FIG. 5 is more efficient than the frequency reuse pattern illustrated in FIG. 1. A more efficient frequency reuse plan allows for greater system utilization (e.g., more mobile stations can be supported).

Frequency reuse plans can also be based on predictive methods using computer modeling. A computer model can predict carrier propagation areas based on antenna height, transmitter power, terrain characteristics, and so forth. Measured carrier data can also be used to create and modify frequency reuse plans. In an IS-136 system, mobile stations report received carrier strengths to the mobile switch coupled to the base stations. The reported carrier strength data can be used to determine how far carriers propagate.

Carrier propagation and co-channel interference can also be measured by receivers that measure received carrier strength as they are driven throughout areas of the mobile system during a so-called "drive test." For example, during a drive test a specific test carrier is transmitted at each cell or sector of a cell involved in the interference testing. A scanning receiver is driven over the roads, highways and traveled byways of the system. The scanning receiver scans and measures the strength of the test carrier signal transmitted by each cell at the points of possible interference, and location determination equipment (e.g., a Global Positioning System ("GPS") unit, a Loran unit, etc.) records the position of the scanning receiving. These strength measurements are then plotted and the expected interference points from different cells may be viewed graphically to determine whether sufficient interference exists to change the channel sets assigned to a particular area. This method of performing a drive test is often referred to as a "key-up" drive test because the test carrier is continuously "keyed-up" at each cell so as to be measured. A test carrier does not carry subscriber communications.

U.S. Pat. No. 5,926,762 ("the '762 patent") describes another type of drive test in which a unique test carrier at each cell site is transmitted such that each cell site is transmitting a different test carrier. A scanning receiver is driven over the roads, highways and traveled byways of the system to measure the strength (typically the received signal power) of each test carrier transmitted by each of the cell sites while location determination equipment records the position of the scanning receiver. According to the '762 patent, transmitting a different test carrier at each cell eliminates interference that can complicate strength measurements when a single carrier is keyed-up at multiple cells for a drive test.

These known methods of performing drive tests to measure carrier strengths and predict co-channel interference require test carriers to be keyed-up to continuously transmit. Whether a single test carrier is keyed-up at a plurality of cells, or different test carriers are keyed-up at different cells, each method requires keying-up a test carrier. When a test carrier is keyed-up, it is not available to carry subscriber communications (e.g., voice traffic), and system capacity is diminished. Thus, key-up drive tests are typically conducted during the evening when demand for system capacity is lowest. In view of the forgoing, it can be appreciated that a substantial need exists for systems and methods that can advantageously provide for determining mobile communication system telephone carrier frequency propagation characteristics.

SUMMARY OF THE INVENTION

The present invention relates to systems and methods for determining mobile communications system carrier propagation characteristics. A system in accordance with an embodiment of the present invention can include a frequency scanner, a signal strength measurement device, digital verification color code logic, a location determining unit, and a memory. The frequency scanner can output a carrier signal corresponding to a carrier signal identifier, where the frequency scanner is located at a geographical location. The signal strength measurement device can be coupled to the frequency scanner and determine a carrier strength indicator of the carrier signal.

The digital verification color code logic can be coupled to the frequency scanner and determine the digital verification color code of the carrier signal. The location determining unit can be coupled to the frequency scanner and determine a location identifier corresponding to the geographical location of the frequency scanner. The memory can be coupled to the frequency scanner and store the carrier signal identifier, the carrier strength indicator, the digital verification color code of the carrier signal, and the location identifier.

According to embodiments of the present invention, a system measures mobile communication system carrier signal strengths and identifies the origin of the carrier signal at a particular location during standard operation of the cellular system. Test carriers need not be "keyed-up" to perform the carrier signal strength measurements, and thereby system capacity need not be reduced while carrier signal strengths are measured and identified. Accordingly, drive tests can be performed during standard operating periods and need not be performed in the middle of the night. The measured and identified carrier strength data can be used to predict carrier interference and for frequency reuse planning purposes.

According to an embodiment of the present invention, a scanning receiver can receive each of the carrier frequencies of a mobile communications system including each of the voice communications carriers and the control carriers. The scanning receiver need not be able to receive each carrier frequency, however, and in another embodiment the scanning receiver can receive at least a subset of the carrier frequencies (e.g., at least every other carrier frequency, at least every third frequency, and so on). The scanning receiver also includes digital verification color code ("DVCC") logic to determine the DVCC transmitted with the carrier. In an IS-136 system, the DVCC is an 8-bit code value that can be assigned by the mobile system operator to be a unique value in each cell. In an embodiment, no cell is assigned a DVCC of 0 or 255, and 254 adjoining cells can each be assigned a unique DVCC having a value of 1-254. In another embodiment, a coded DVCC is included in the carrier signal, where the coded DVCC is an 8-bit code augmented with a 4-bit Hamming code for error protection. In another embodiment, the 12-bits available for a coded DVCC can be used to transmit a 12-bit extended DVCC that can specify upwards of 4,096 different values of an extended DVCC.

DETAILED DESCRIPTION OF THE INVENTION

In accordance with an embodiment of the present invention, a location determination unit (e.g., a GPS unit, a Loran unit) is coupled to the scanning receiver to provide geographic location information. The scanning receiver sequentially tunes to each carrier signal, and the received signal strength of each carrier is measured. Each received carrier signal is also input to the DVCC logic so that the DVCC can be read from the carrier signal. The location determination logic outputs location information identifying the geographic position of the scanning receiver. A data record is created (e.g., a data record of a database) to store the signal strength and the DVCC of the received carrier together with the location information that identifies where the carrier signal was measured and identified.

Figure 6:
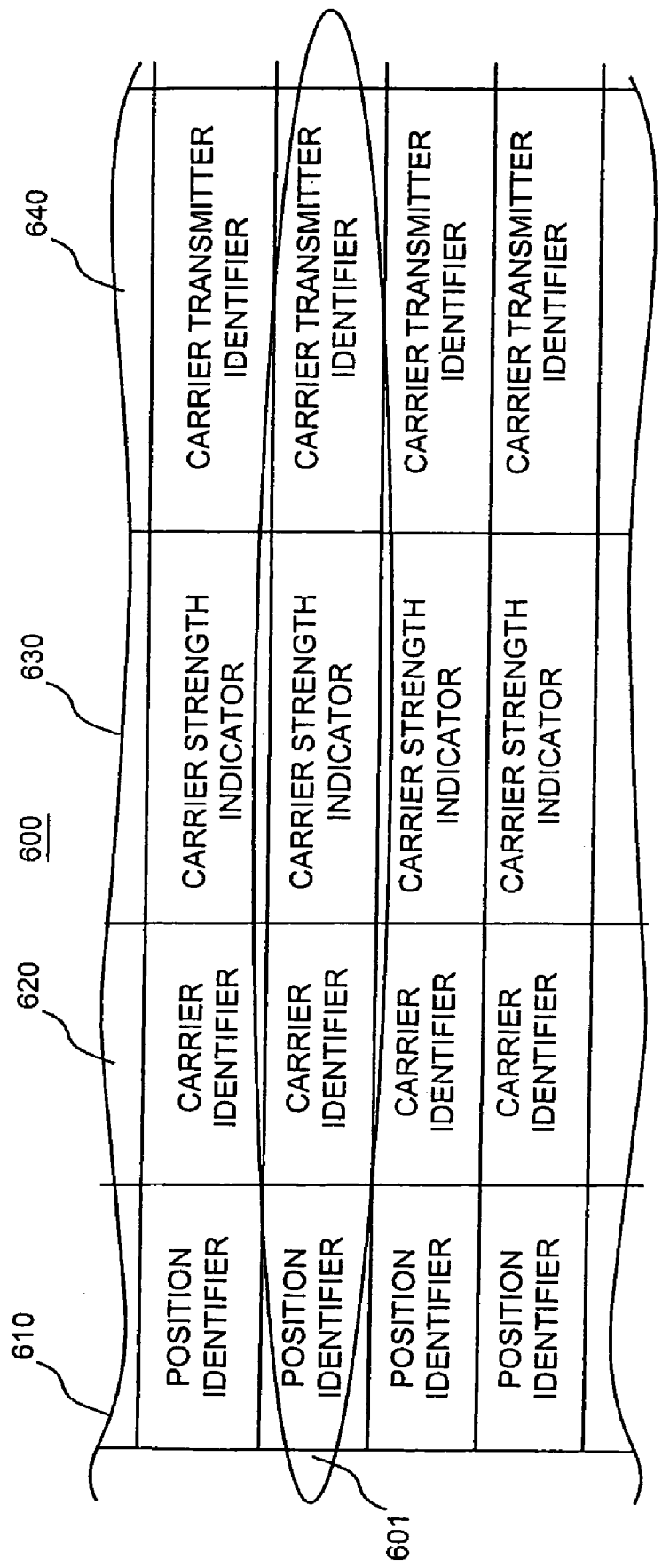
FIG. 6 shows an illustration of an embodiment of the present invention.

FIG. 6 shows an illustration of an embodiment of the present invention. A database 600 includes a plurality of the data records such as data record 601. Each data record of database 600 can include at least in part a position identifier field 610 to store a position identifier, a carrier identifier field 620 to store a carrier identifier, a carrier strength indicator field 630 to store a carrier strength indicator, and a carrier transmitter identifier field 640 to store a carrier transmitter identifier. According to an embodiment of the present invention, the data records of database 600 are populated during a drive test in which a scanning receiver outputs a carrier signal corresponding to a carrier identifier (e.g., an integer corresponding to a particular frequency, a carrier frequency, and so on) and the carrier strength (e.g., in dBm's (decibles/milliwat), etc.) and the DVCC of the received carried signal are determined along with the geographic location.

Figure 7:
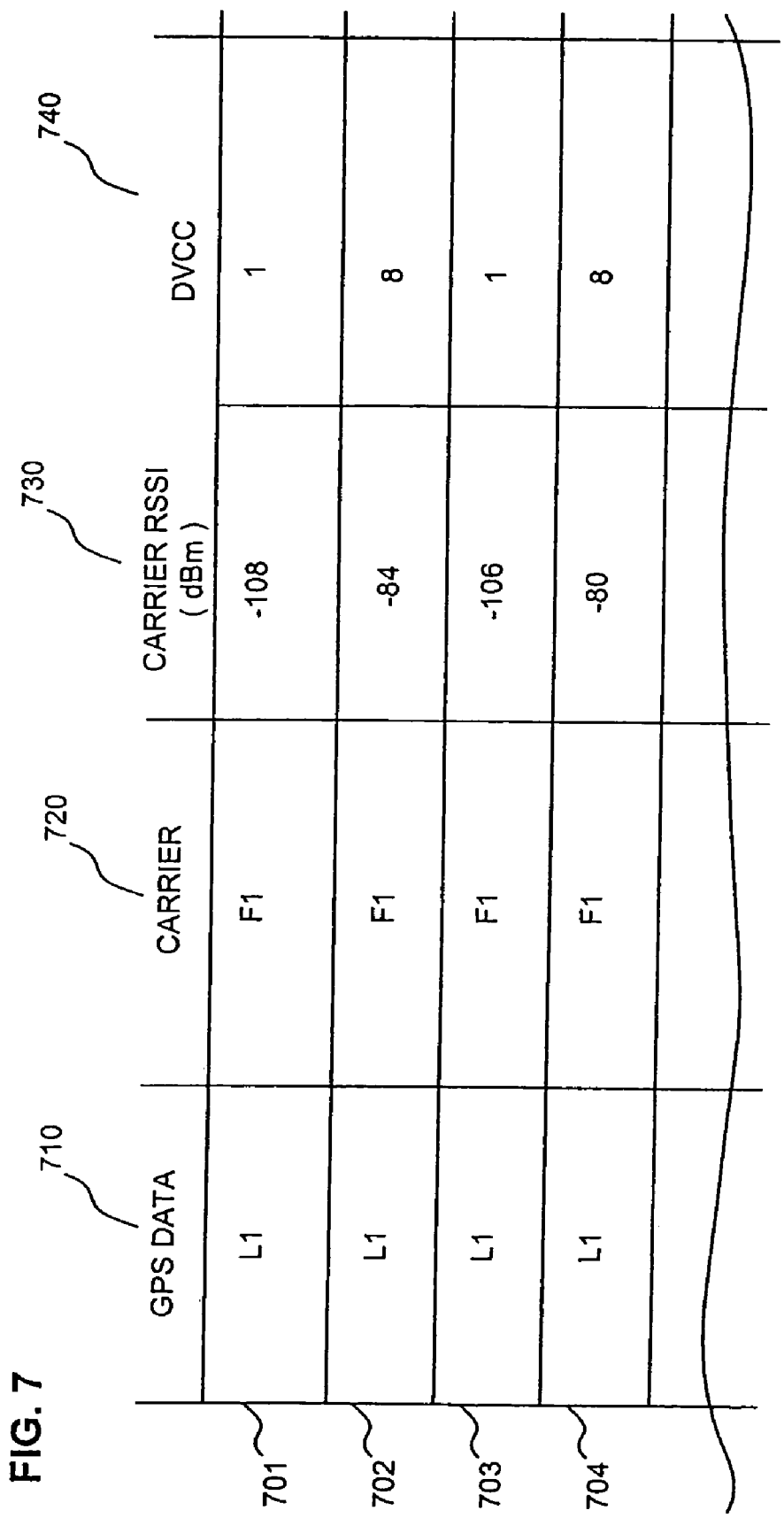
FIG. 7 shows another illustration of an embodiment of the present invention.

FIG. 7 illustrates another embodiment of the present invention. Database 700 is populated with a plurality of data records 701-704. Each of data records 701-704 include a location identifier field 701, a carrier identifier field 720, a carrier strength indicator field 730, and a carrier transmitter identifier 704. Data record 701 shows data determined and stored in accordance with an embodiment of the present invention. Data records 701-704 show data determined at a location L1 for four instances of a carrier signal F1. Data records 701-704 show that two different carrier signals F1 were measured and identified at location L1: a carrier signal F1 having a DVCC of 1 and a carrier signal F1 having a DVCC of 8. In data records 701 and 703, carrier signal F1 having a DVCC of 1 had strengths of −108 dBm and −106 dBm respectively. In data records 702 and 704, carrier signal F1 having a DVCC of 8 had strengths of −84 dBm and −80 dBm respectively. Each of carrier signal F1 having DVCC of 1 and carrier signal F1 having a DVCC of 8 can be measured and identified because different cells will utilize different carriers during different periods due to call handling characteristics. For example, carrier signal F1 having a DVCC of 1 (hereinafter "carrier F1-CC1") can be measured as a first call is carried by a first cell over carrier F1-CC1, while an adjoining second cell is not transmitting carrier F1-CC8. Subsequently, the first call is terminated and the first cell is not transmitting carrier F1-CC8 (e.g., the first cell has no call that needs to be carried over carrier F1-CC8). Then, carrier signal F1-CC8 can be measured when a second call is carried by the second cell over carrier F1-CC8, while the first cell is not transmitting carrier F1-CC1.

Whereas known drive test systems and methods for identifying the strengths of carrier signals require transmission of specified test carriers typically during periods of low system utilization, embodiments of the present invention allow for the measurement of operational carriers during standard operation of the system, e.g., without transmission of one or more test carriers. While there are periods in which a carrier cannot be measured (e.g., when there is co-channel interference between two transmissions of the carrier), different instances of the carrier transmitted from different cells can be measured as the carrier is used during different time periods by different cells. For example, a first cell may use a carrier to handle a call while the second cell is not using that carrier. Thus, the carrier transmitted by the first cell can be measured and identified without interference from the second cell.

Embodiments of the present invention advantageously do not require keying-up test carriers for performance of drive tests. Keying-up test carriers can decrease system capacity because the test carrier is not available to handle subscriber communications. Moreover, test carriers may be taken off the air by mobile communications system personnel that are not aware that a drive test is being performed. For example, a field engineer may note that a carrier is not in operational service and put that carrier back into service even though it was being used as a test carrier. Also, provisioning of test carriers in a portion of a mobile communication system can require generations of scripts to key-up a test carrier in a first cell and take that carrier down in surrounding cell sites.

Figure 1:
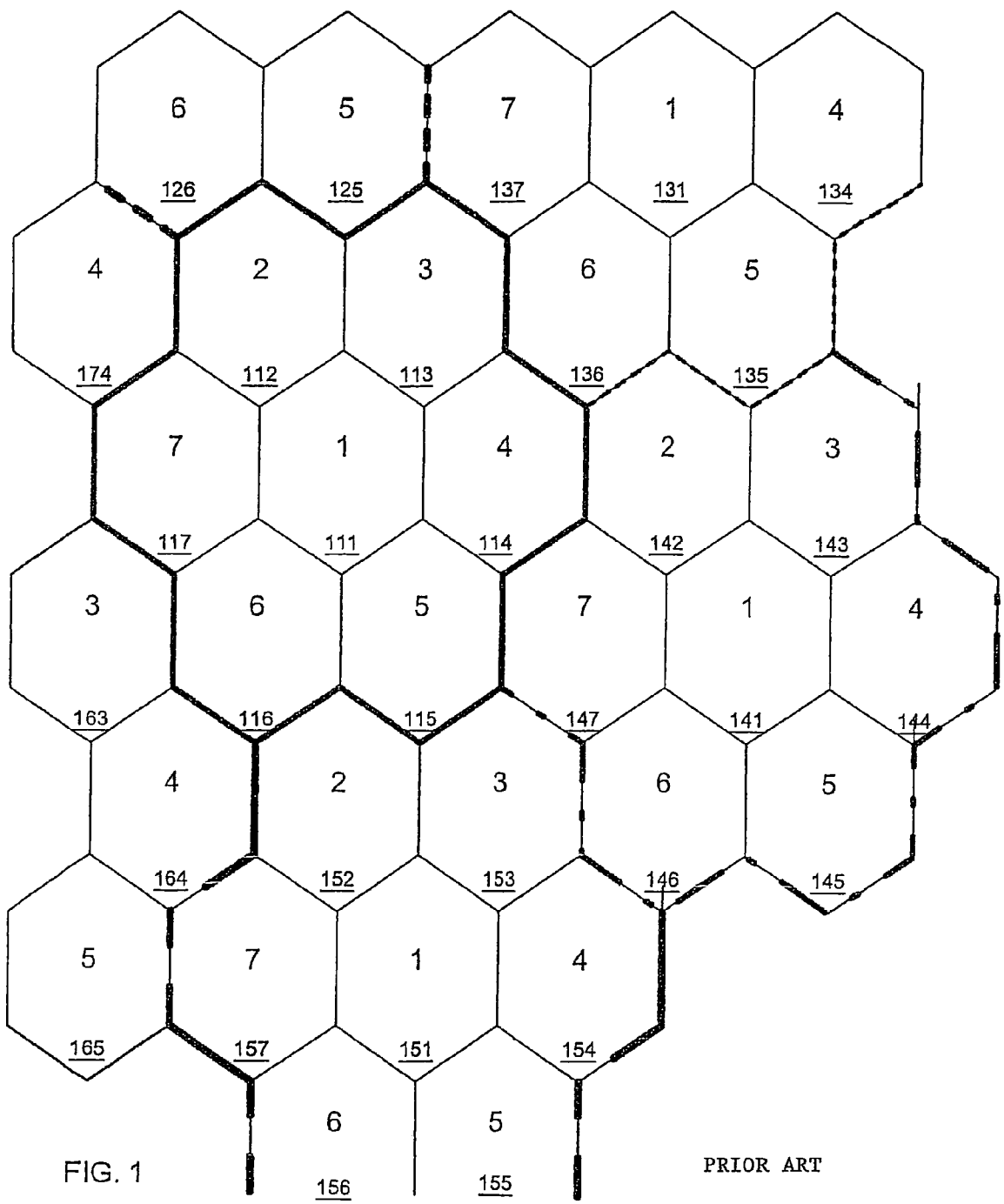
FIG. 1 illustrates a frequency reuse plan typically referred to as having n=7 clusters.
Figure 2:
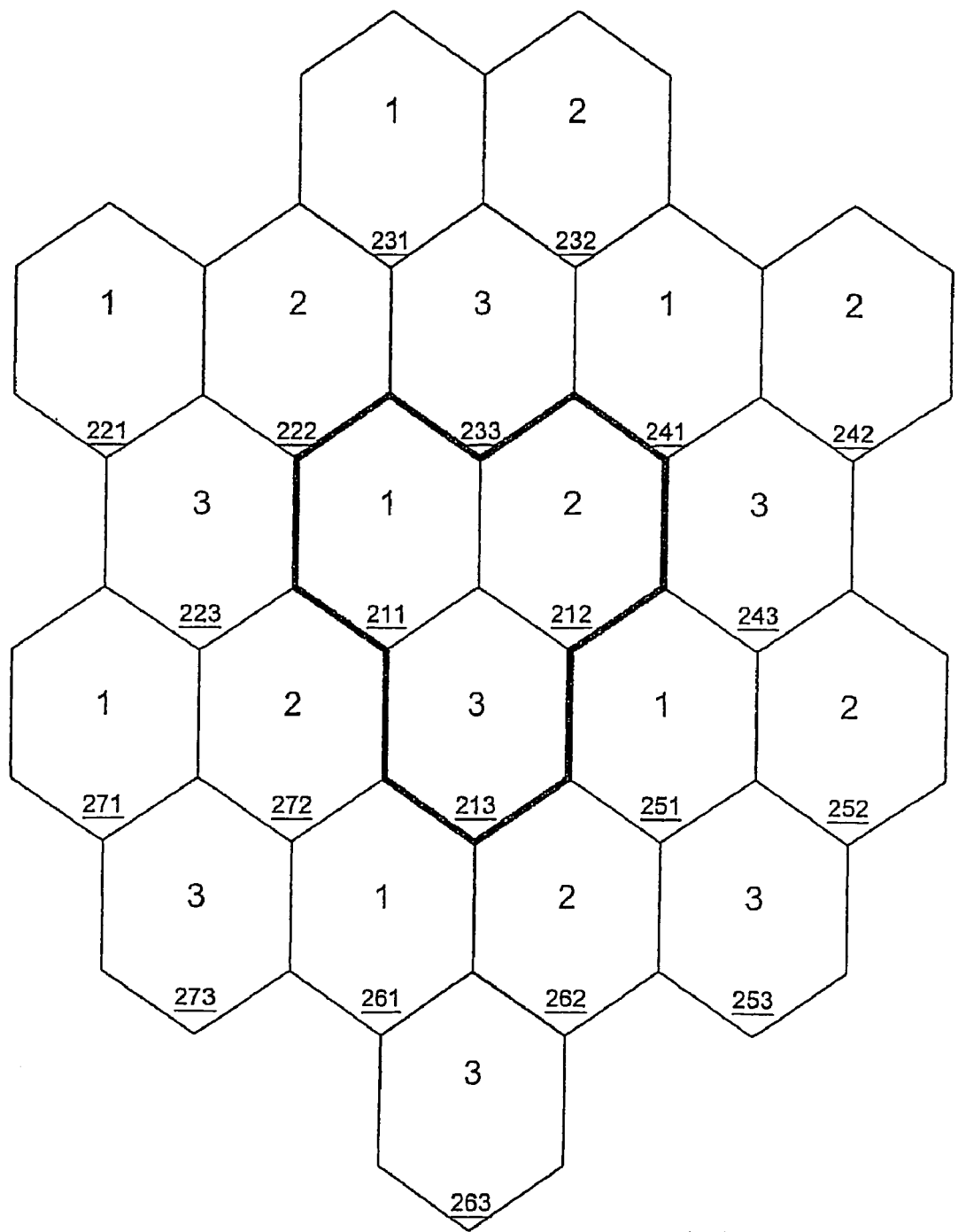
FIG. 2 illustrates a frequency reuse plan having n=3 clusters.
Figure 3:
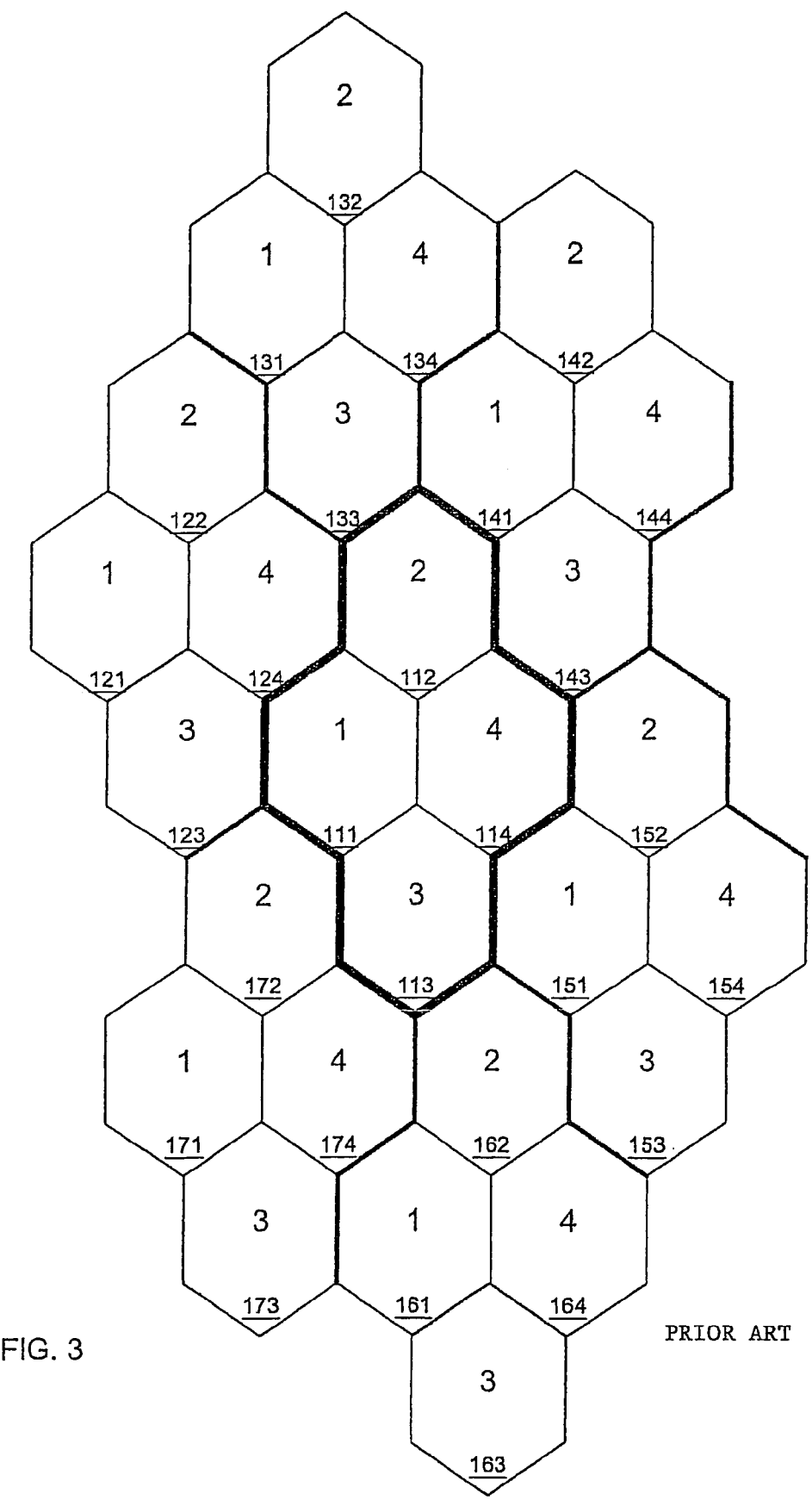
FIG. 3 illustrates a frequency reuse plan having n=4 clusters.
Figure 4:
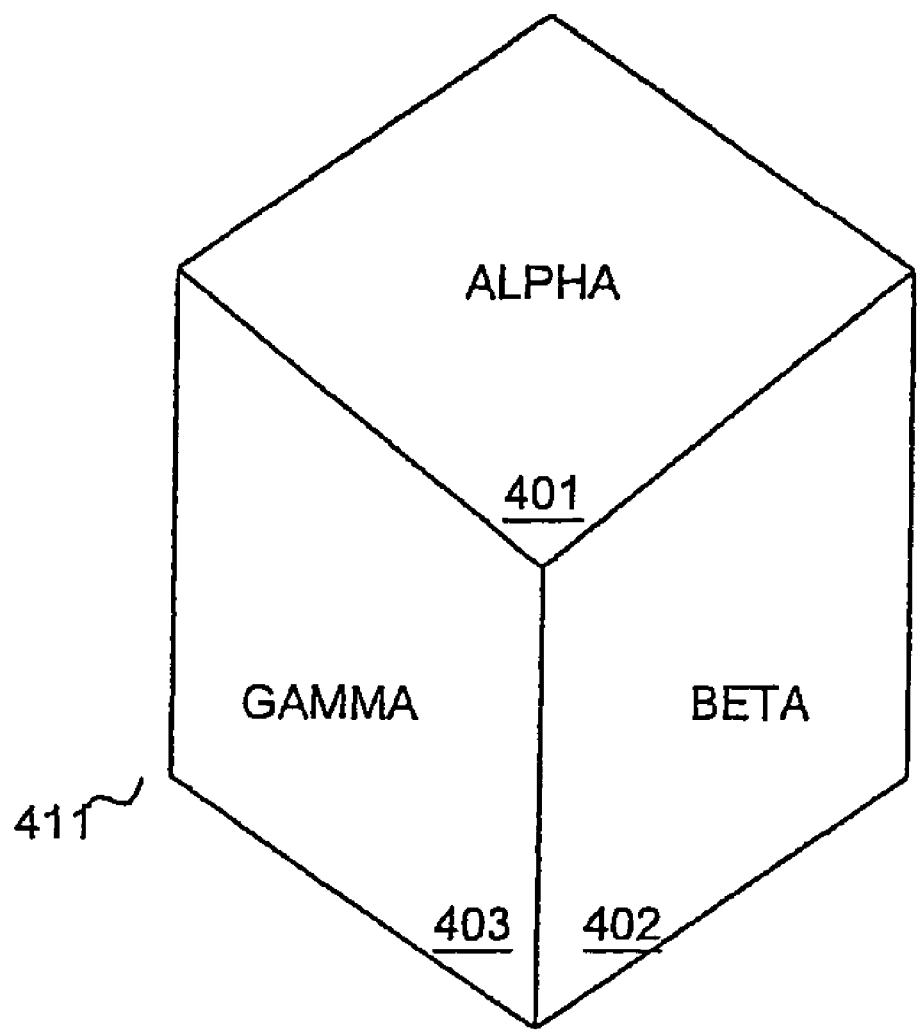
FIG. 4 is an illustration of a sectored cell.
Figure 5:
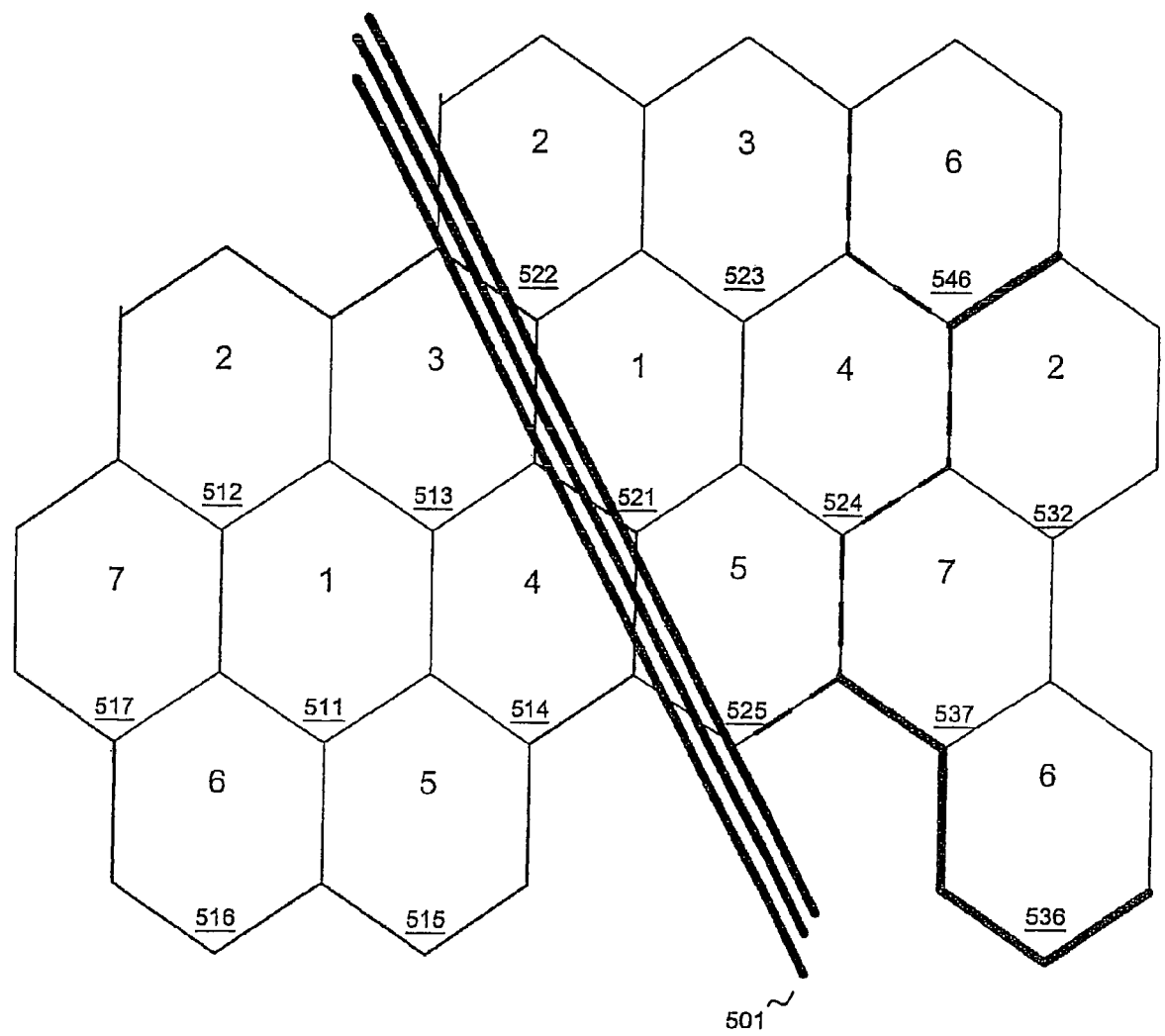
FIG. 5 illustrates a frequency reuse pattern that has been modified based on terrain characteristics.
Figure 8:
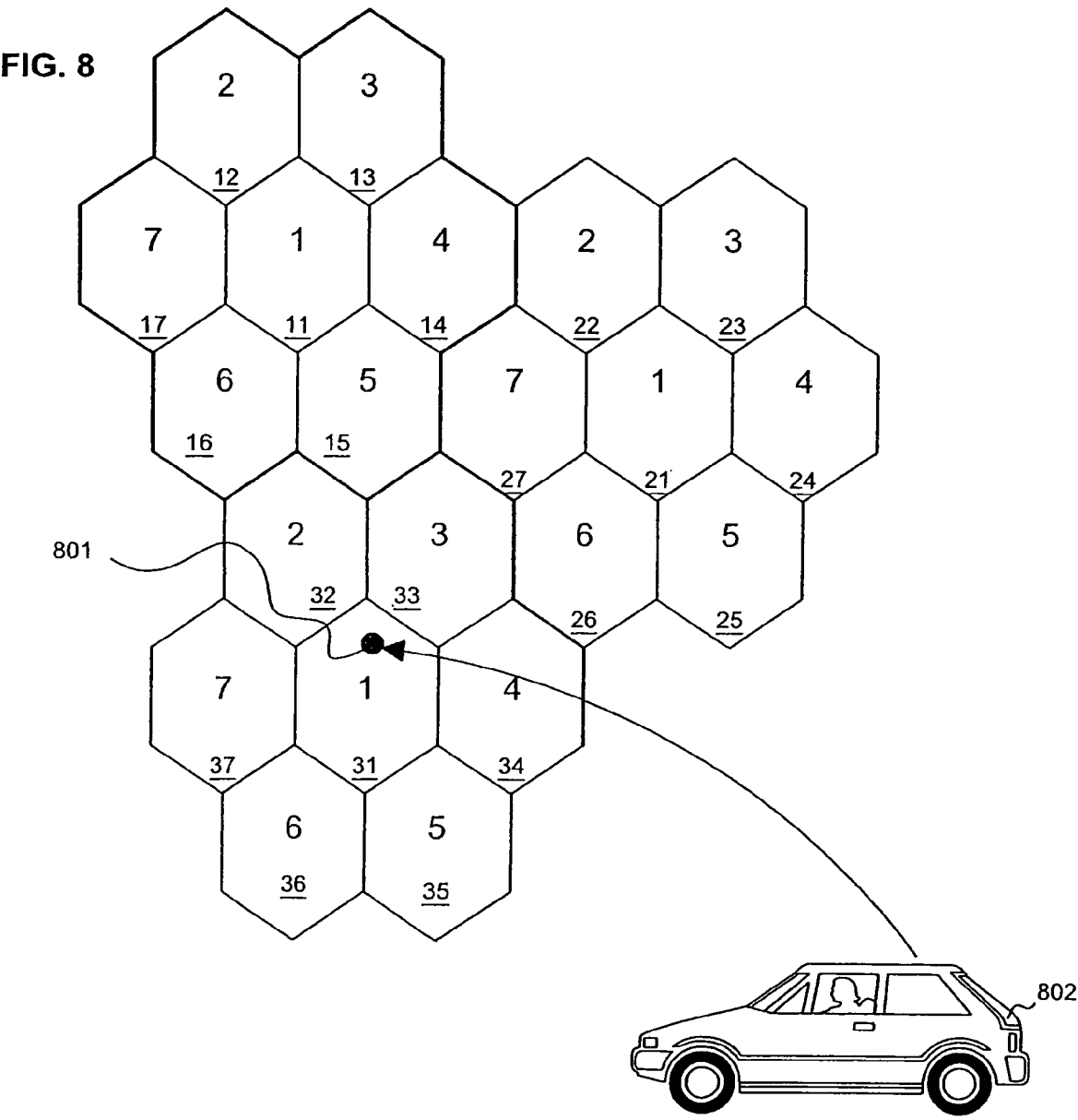
FIG. 8 shows a frequency reuse plan of a mobile communications system.

FIG. 8 illustrates a frequency reuse plan of a mobile communications system in which an embodiment of the present invention can measure and identify carrier signals. The frequency reuse plan illustrated in FIG. 8 is merely an exemplary frequency reuse plan in which an embodiment of the present invention can be operated. For example, an embodiment of the present invention can be utilized in idealized frequency reuse plans as illustrated in FIGS. 1-3 as well as other frequency reuse plans. A vehicle 802 including an embodiment of the present invention can be located at position 801 within cell 31. A frequency scanner can scan various carrier frequencies of the mobile communications system. In an embodiment, the frequency scanner can scan each of the carrier frequencies of the mobile communications system. In another embodiment, the frequency scanner can scan a representative subset of the carrier frequencies of the mobile communications system.

Each of the cells of the mobile communications system illustrated in FIG. 8 can transmit a unique DVCC over each of the carriers transmitted by the respective cell. For example, cell 31 can transmit a DVCC of 31 over each carrier transmitted by cell 31, cell 32 can transmit a DVCC of 32 over each carrier transmitted by cell 32, cell 33 can transmit a DVCC of 33 over each carrier transmitted by cell 33, cell 34 can transmit a DVCC of 34 over each carrier transmitted by cell 34, and so on. Likewise, cell 11 can transmit a DVCC of 11 over each carrier transmitted by cell 11, cell 12 can transmit a DVCC of 12 over each carrier transmitted by cell 12, cell 13 can transmit a DVCC of 13 over each carrier transmitted by cell 13, cell 14 can transmit a DVCC of 14 over each carrier transmitted by cell 14, and so on. As a further example, cell 21 can transmit a DVCC of 21 over each carrier transmitted by cell 21, cell 22 can transmit a DVCC of 22 over each carrier transmitted by cell 22, cell 23 can transmit a DVCC of 23 over each carrier transmitted by cell 23, cell 24 can transmit a DVCC of 24 over each carrier transmitted by cell 24, and so on. In accordance with an embodiment of the present invention, cells of an area will be assigned consecutive DVCCs so that a greater number of carriers can be identified by a particular DVCC.

A frequency scanner at location 801 can receive at least each of carrier frequency F1 having a DVCC of 11 ("carrier F1-CC11") from cell 11, carrier frequency F1 having a DVCC of 21 ("carrier F1-CC21") from cell 21, and carrier frequency F1 having DVCC of 31 ("carrier F1-CC31") from cell 31. In accordance with an embodiment of the present invention, the frequency scanner outputs a carrier signal corresponding to a carrier identifier (e.g., carrier frequency F1, carrier frequency F2), and the carrier strength (e.g., in dBm's (decibels/milliwat), etc.) and the DVCC of the received carried signal are determined along with the geographic location and time the carrier signal was received. The determined data can be sent to a database in accordance with an embodiment of the present invention.

Figure 9:
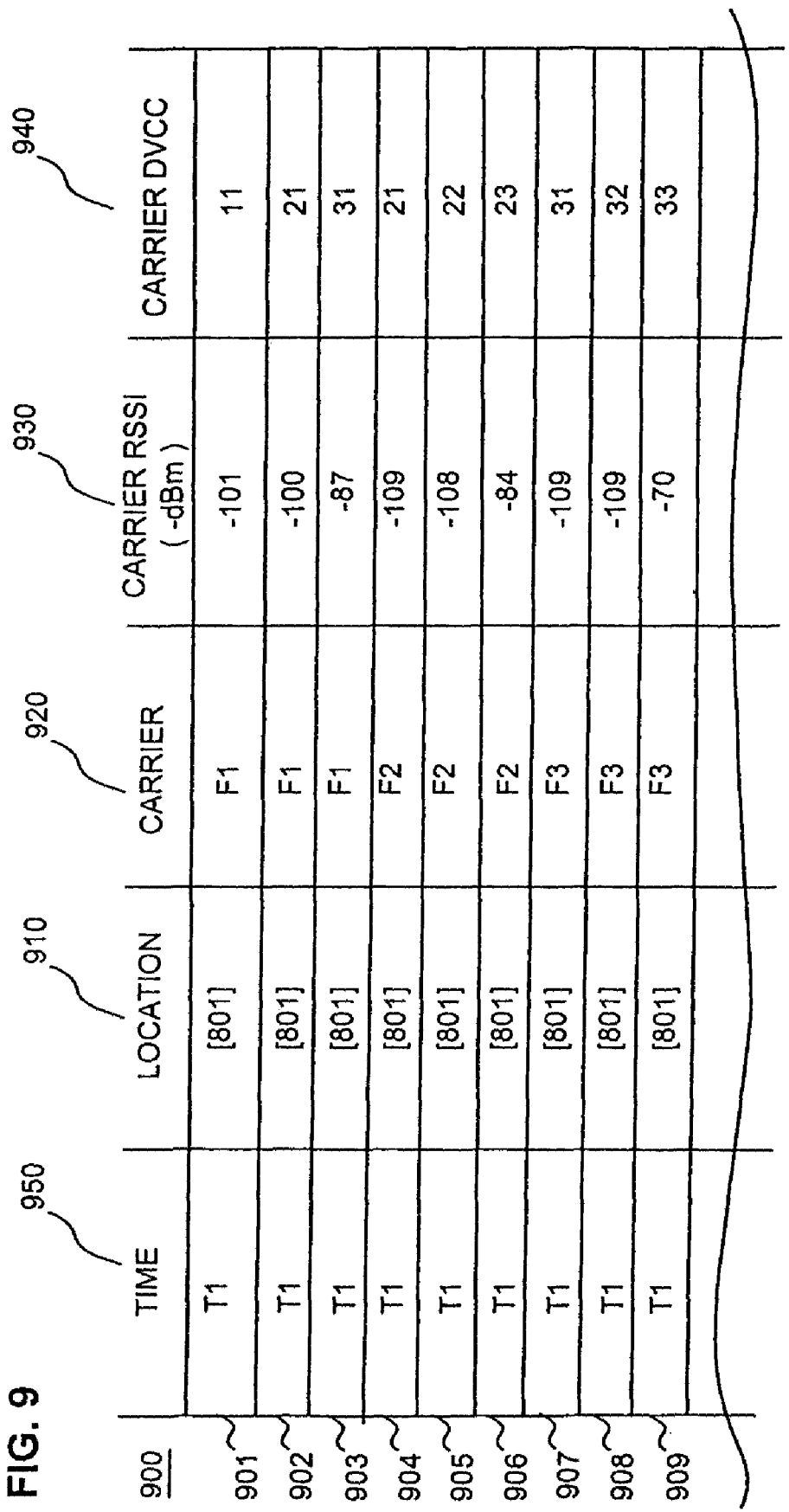
FIG. 9 shows an illustration of another embodiment of the present invention.

FIG. 9 shows illustration of another embodiment of the present invention. Data records 901-909 can be written to database 900, where each data record includes at least one or more of a time identifier field 950, a location identifier field 910, a carrier identifier field 920, a carrier strength indicator field 930, and a carrier transmitter identifier field 940. In accordance with an embodiment of the present invention, a time identifier is determined and stored in the data records of the database so that data from separate drive tests can be aggregated and, if necessary, normalized (e.g., adjusted for varying transmitter strengths).

Figure 10:
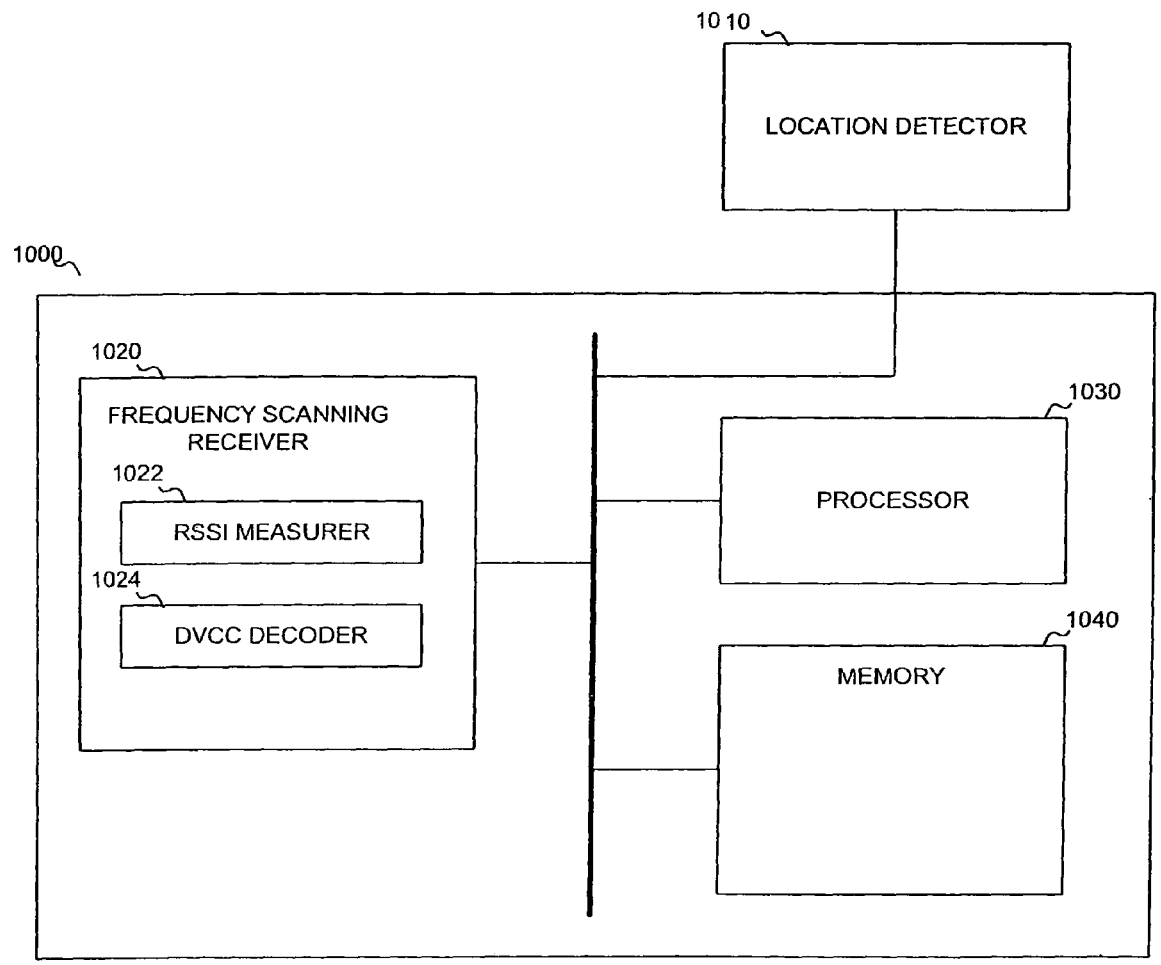
FIG. 10 is a schematic diagram showing an embodiment of the present invention.

FIG. 10 is a schematic diagram of an embodiment of the present invention. In an embodiment, system 1000 includes a processor 1030 and a memory 1040. Processor 1030 can be, for example, a microcontroller manufactured by Intel Corp. of Santa Clara, Calif. As another example, processor 111 can be an Application Specific Integrated Circuit (ASIC). Memory 1040 can be a random access memory (RAM), a dynamic RAM (DRAM), a static RAM (SRAM), a volatile memory, a non-volatile memory, a flash RAM, a cache memory, a hard disk drive, a magnetic storage device, an optical storage device, a magneto-optical storage device, or a combination thereof. As used to describe embodiments of the present invention, the term "coupled" encompasses a direct connection, an indirect connection, or a combination thereof. Moreover, two devices that are coupled can engage in direct communications, in indirect communications, or a combination thereof. Memory 1040 of system 1000 can store a plurality of instructions adapted to be executed by processor 1030.

System 1000 includes a frequency scanning receiver 1020, which includes, or is coupled to, an RSSI measurer 1022 and a DVCC decoder 1024. RSSI measurer 1022 is an example of a signal strength measurer, other signal strength measurement units can be used in embodiments of the present invention. A location detector 1010 (e.g., a GPS unit, a Loran unit) is coupled to system 1000. In accordance with an embodiment of the present invention, system 1000 scans at least a subset of carrier frequencies of a mobile communications system to determine the strength and DVCC of each received carrier. Memory 1040 can store identifiers of the received carrier, the received carrier strength, and the received carrier DVCC in, for example, a data record of a database. Each data record can also include an identifier of the location of the system 1000 at the time the carrier was received, measured and identified.

An embodiment of the present invention determines the DVCC of a received carrier signal to identify the source (e.g., the transmitter, the cell) of the received carrier signal. Other embodiments of the present invention can identify the source of the received carrier signal in other manners. For example, in accordance with an embodiment of the present invention, a mobile communications system is synchronized. When the frequency scanner receives and measures a carrier signal, it determines the time delay of the received carrier signal. Based on the time delay and the geographic location of the frequency scanner when the carrier signal is received, the source of the received carrier signal can be determined.

As another example, cells of a mobile communications system may have substantially similar but different carrier sets. For example, referring to FIG. 8, cell 11 may transmit carriers F1, F8, and F15, and cell 21 may transmit carriers F1, F8, F15, and F22. Cell 21 may transmit more carriers than cell 11 because cell 21 requires higher capacity than cell 11. When a frequency scanner at location 801 measures a strong F1 and a weak F22, then it can be determined that F1 did not come from cell 21 because F1 would be the same strength as F22 if it came from cell 21.

In another embodiment of the present invention, each cell transmits a unique identifying code via the Shirt Messaging Service ("SMS") over its control channel. A frequency scanner receives and determines the carrier strength and the SMS code of the control channel. The scanning frequency also determines the strength of received carriers. The source of received carriers can be determined by at least roughly matching the strengths of the received carriers and the SMS code. For example, referring again to FIG. 8, a frequency scanner at location 801 receives, measures and decodes the identifying SMS code of the control frequency from cells 11, 21, and 31. The frequency scanner can also measure the strength of received carriers. Received carriers that have approximately the same strength as the identified control frequencies can be identified as coming from the cell of the identified control frequency.

In accordance with an embodiment of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable memory is accessed by a processor suitable for executing instructions adapted to be executed. The term "adapted to be executed" is meant to encompass any instructions that are ready to be executed in the present form (e.g., machine code) by a processor, or require further manipulation (e.g., compilation, decryption, or provided with an access code, etc.) to be ready to be executed by a processor.

Systems and methods in accordance with the embodiments of the present invention disclosed herein can advantageously receive, measure, and identify the source of the carrier frequencies of mobile communications systems. Carriers can be identified by decoding a DVCC, comparing frequency signatures of cells, measuring time delays in a synchronized system, or decoding SMS information. Embodiments of the present invention advantageously allow for determining carrier signal propagation characteristics without keying-up test carriers. Carrier signal propagation characteristics can be determined during routine operation of the mobile communications system, and need not be performed during non-peak capacity periods by method that reduce system capacity.

Embodiments and methods for determining mobile communication system carrier propagation characteristics have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the forgoing detailed description, systems and methods in accordance with embodiments of the present invention have been described with reference to specific exemplary embodiments. Accordingly, the present specification and figures are to be regarded as illustrative rather than restrictive.

What is claimed is:

1. A method for determining mobile communications system carrier propagation characteristics, the method comprising:

receiving at a location a carrier signal from a transmitter of the mobile communications system, the mobile communications system operating in a standard operational mode, the carrier signal corresponding to a call handled by a cell without the cell keying up a test carrier frequency;

determining a strength indicator of the received carrier signal;

identifying the source of the received carrier signal; and storing a carrier signal identifier corresponding to the received carrier signal, the signal strength indicator and a source identifier corresponding to the identified source of the received carrier signal, wherein the mobile communications system does not decrease system capacity during the operation of said method for determining mobile communications system carrier propagation characteristics;

wherein identifying the source of the received carrier includes decoding a Short Messaging Service (SMS) message transmitted on a control channel from the transmitter, the SMS message providing a unique identifying code identifying a cell generating the received carrier signal with the unique identifying code.

2. The method of claim 1, wherein the carrier signal includes the control channel.

3. The method of claim 1, wherein the carrier signal is a carrier signal carrying subscriber communications.

4. The method of claim 1, wherein the carrier signal in not a test carrier.

5. The method of claim 1, wherein operating a mobile communications system in a standard operational mode includes not transmitting a test carrier.

6. The method of claim 5, wherein the test carrier is a keyed-up carrier that does not carry subscriber communications.

7. The method of claim 1, wherein determining the source of the received carrier includes determining that the received carrier has a received signal strength that is at least approximately the same as a received carrier from a known source.

8. The method of claim 1, wherein determining the source of the received carrier includes determining that the received carrier has a received signal strength that is not at least approximately the same as a received carrier from a known source.

9. The method of claim 1, wherein determining the source of the received carrier includes determining the time delay of the received carrier.

10. The method of claim 1, further comprising determining carrier propagation characteristics of the received carrier signal based at least in part on one or more of the carrier signal identifier, the signal strength indicator and the source identifier.

11. A method for determining mobile communications system carrier propagation characteristics, the method comprising:

a step for receiving at a location a carrier signal from a transmitter of the mobile communications system, the mobile communications system operating in a standard operational mode, the carrier signal corresponding to a call handled by a cell without the cell keying up a test carrier frequency;

a step for determining a strength indicator of the received carrier signal;

a step for identifying the source of the received carrier signal; and a step for storing a carrier signal identifier corresponding to the received carrier signal, the signal strength indicator, and a source identifier corresponding to the identified source of the received carrier signal, wherein the mobile communications system does not decrease system capacity during the operation of said method for determining mobile communications system carrier propagation characteristics;

wherein the step for identifying the source of the received carrier includes decoding a Short Messaging Service (SMS) message transmitted on a control channel from the transmitter, the SMS message providing a unique identifying code identifying a cell generating the received carrier signal with the unique identifying code.

12. The method of claim 11, wherein the carrier signal is not a test carrier.

13. The method of claim 11, wherein the carrier signal carries at least one of the control channel and a subscriber communications channel.

14. The method of claim 11, further comprising a step for determining carrier propagation characteristics of the received carrier signal based at least in part on one or more of the carrier signal identifier, the signal strength indicator and the source identifier.

15. A computer-readable medium storing a plurality of instructions adapted to be executed by a processor for determining mobile communications system carrier propagation characteristics, the plurality of instructions comprising instructions to:

receive at a location a carrier signal from a transmitter of the mobile communications system, the mobile communications system operating in a standard operational mode, the carrier signal corresponding to a call handled by a cell without the cell keying up a test carrier frequency;

determine a strength indicator of the received carrier signal;

identify the source of the received carrier signal; and store a carrier signal identifier corresponding to the received carrier signal, the signal strength indicator and a source identifier corresponding to the identified source of the received carrier signal, wherein the mobile communications system does not decrease system capacity during the operation of said system for determining mobile communications system carrier propagation characteristics;

wherein identifying the source of the received carrier includes decoding a Short Messaging Service (SMS) message transmitted on a control channel from the transmitter, the SMS message providing a unique identifying code identifying a cell generating the received carrier signal with the unique identifying code.

16. The computer-readable medium of claim 15, wherein the carrier signal is not a test carrier.

17. The computer-readable medium of claim 15, wherein the plurality of instructions further comprise instructions to determine carrier propagation characteristics of the received carrier signal based at least in part on one or more of the carrier signal identifier, the signal strength indicator, and the source identifier.

18. A system for determining mobile communications system carrier propagation characteristics, the system comprising:

means for receiving at a location a carrier signal from a transmitter of the mobile communications system, the mobile communications system operating in a standard operational mode, the carrier signal corresponding to a call handled by a cell without the cell keying up a test carrier frequency;

means for determining a strength indicator of the received carrier signal;

means for identifying the source of the received carrier signal; and means for storing a carrier signal identifier corresponding to the received carrier signal, the signal strength indicator, and a source identifier corresponding to the identified source of the received carrier signal, wherein the mobile communications system does not decrease system capacity during the operation of said system for determining mobile communications system carrier propagation characteristics;

wherein the means for identifying the source of the received carrier includes means for decoding a Short Messaging Service (SMS) message transmitted on a control channel from the transmitter, the SMS message providing a unique identifying code identifying a cell generating the received carrier signal with the unique identifying code.

19. The system of claim 18, wherein the carrier signal is not a test carrier.

20. The system of claim 18, further comprising means for determining carrier propagation characteristics of the received carrier signal based at least in part on one or more of the carrier signal identifier, the signal strength indicator, and the source identifier.

* * * * *